Figure 3:
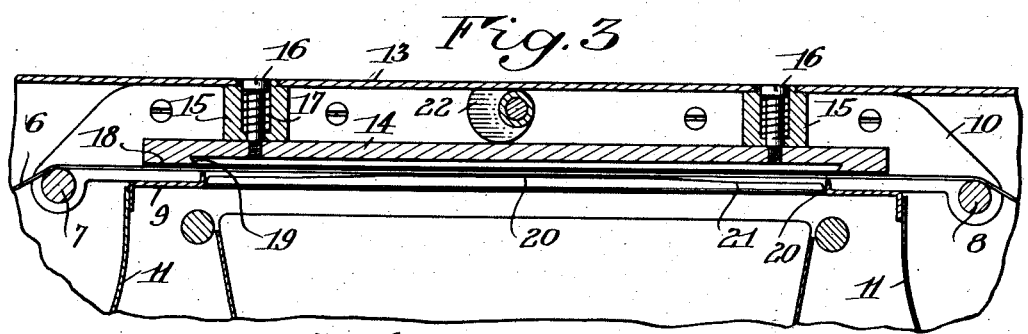

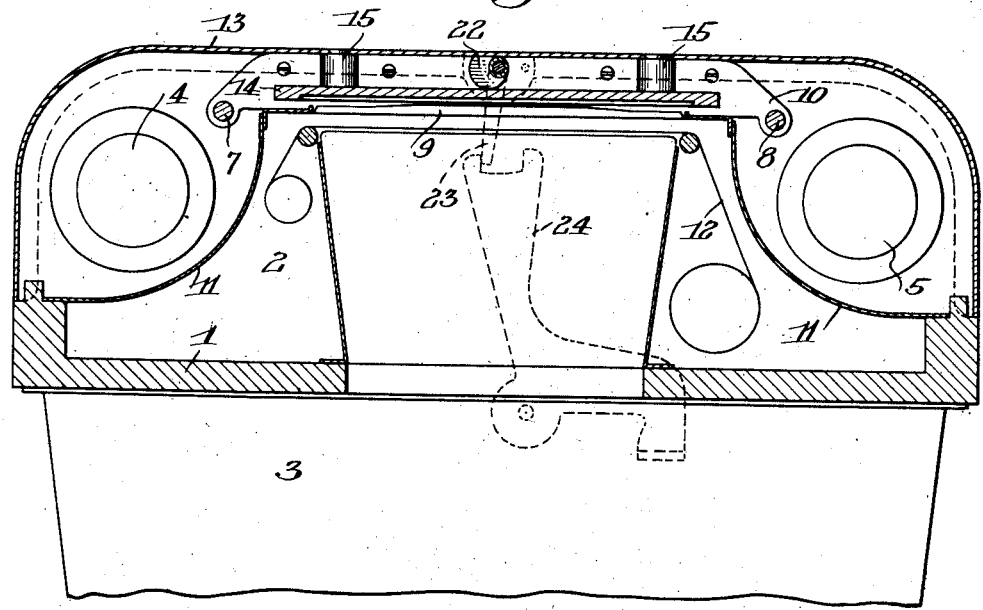

Oct. 27, 1931. A. H. BECK 1,829,332
METHOD OF AND APPARATUS FOR HOLDING PHOTOGRAPHIC
FILMS IN FLAT POSITION DURING EXPOSURE
Filed March 17, 1930 2 Sheets-Sheet 2

INVENTOR
Alwin H. Beck
BY D. Clyde Jones
his ATTORNEY

Patented Oct. 27, 1931

1,829,332

UNITED STATES PATENT OFFICE

ALWIN H. BECK, OF ROCHESTER, NEW YORK, ASSIGNOR TO FOLMER GRAFLEX CORPORATION, OF ROCHESTER, NEW YORK, A CORPORATION OF DELAWARE

METHOD OF AND APPARATUS FOR HOLDING PHOTOGRAPHIC FILMS IN FLAT POSITION DURING EXPOSURE

Application filed March 17, 1930. Serial No. 436,316.

This invention relates to the method of and apparatus for holding a flexible photographic strip in a substantially flat position during exposure.

It is well-known that wherever any portion of a photographic film is uneven during exposure, certain parts of the resulting picture are distorted and out of focus. While this difficulty is not serious where relatively small exposure areas are used or where the object is relatively near to the camera, it is especially pronounced and must be eliminated in aerial photography where large exposure areas of film are used and where the great distance between the camera and the object causes any uneveness in the film to produce a defective picture.

Two main methods have been utilized in maintaining the exposure section of the film flat, the first of which employs a backing plate for the film having openings whereby suction is applied to the back of the film strip to hold it against the plate. This suction, in aerial cameras has been developed by the use of a Venturi tube to which there was attached a flexible hose and while the results obtained with this type of camera have been especially satisfactory the use of the hose is undesirable since it introduces another hazard for the pilot of the plane.

The second method, which has been used for holding the exposure area of the film flat, has included a flat backing plate and a transparent plate spaced therefrom a distance sufficient to permit ready passage of the film therebetween. In this second method the exposure is made through the glass plate with the consequent loss of light due to its absorption by the glass so that the resulting picture is less clearly defined. An additional difficulty in the use of such a glass plate arises from the fact that the friction of the film strip against the glass and the backing plate develops static electricity which causes small electrical discharges throughout the exposure area of the film appearing as irregular fine lines on the finished picture.

In accordance with the present invention, an arrangement is provided for holding the exposure section of a film strip substantially flat without the use of suction tubes and without the need of a glass plate through which the film section is exposed. The main feature of the invention comprises the method of stretching the exposure section of the film strip by first applying pressure to spaced points on four sides of the exposure area and then progressively applying the pressure to the major portion of the space between the separated points. Another feature of the invention includes the use of a backing plate cooperating with an upright rim of irregular contour on an exposure frame so that the relative movement of the backing plate and the frame stretches the exposure area of the film strip against the backing plate whereby the exposure area is substantially flat, that is, without any noticeable irregularity or waviness in its surface. Another feature of the invention resides in the use of a backing plate and an exposure frame in cooperative engagement, during exposure of the film, yet sufficiently spaced at other times so that the film is substantially out of engagement therewith during the major portion of its movement thereby obviating electrical discharges due to the frictional generation of electricity.

Figure 4:
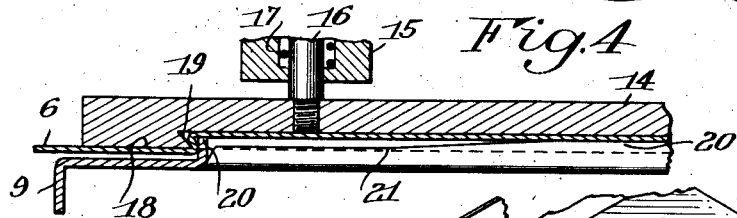
Figure 5:
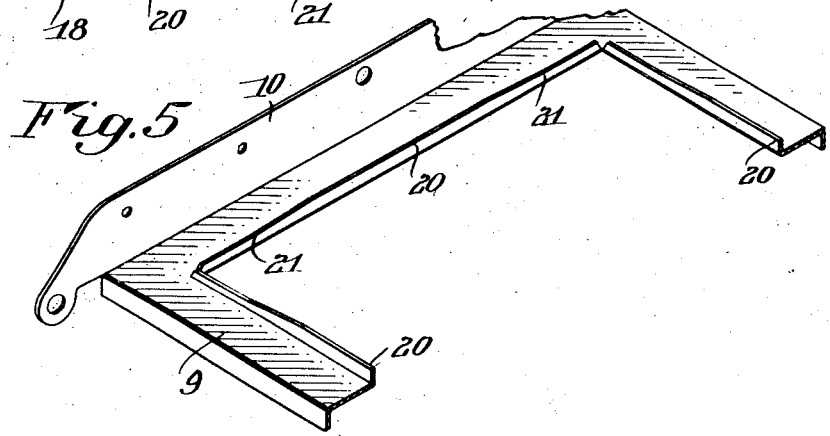

These and other features will appear from the detailed description and claims when taken with the drawings in which Fig. 1 is a vertical section through a portion of the camera including the present invention showing the film-stretching means in its normal position and Fig. 2 is a similar sectional view showing the film-stretching means in operative position; Fig. 3 is an enlarged detailed view in section showing the position of the film with respect to the film-stretching elements when these elements are in their normal or inoperative position; Fig. 4 is an enlarged sectional view of a fragment of the film-stretching means showing the position of the film ready for exposure; Fig. 5 is a fragmentary perspective view of a portion of the exposure frame showing the irregular contour of its rim; and Fig. 6 is a modified form of backing plate which may be adjusted to stretch the film independently of the shutter operating means in the event that it is not desired to operate the backing plate automatically.

Referring to the drawings, 1 indicates a camera frame having on its upper side a camera magazine generally designated 2 and on its lower side the cone 3 which serves as a support for the lens mount (not shown). The sides of the magazine provide suitable mountings for the film release spool 4 and the film takeup spool 5, which spools advance the film 6 (Fig. 3) in progressive steps by means (not shown) to present successive sections of the film strip for exposure. The film in moving from the spool 4 to the takeup spool 5 is guided by the film idlers 7 and 8 which support a section of film over the exposure frame 9. This exposure frame, which is preferably formed of sheet metal, has side pieces supporting the idlers 7 and 8, and has a struck up rectangular rim best shown in the enlarged fragmentary view of Fig. 5. The rim at each side of the opening in the exposure frame, has a crowned portion 20 near its center which gradually becomes shallower until it approaches a substantially flat portion such as 21 near each corner thereof. The magazine has film shields 11 engaging the base 1 and the edge of the exposure frame 9 to prevent light from gaining access to the portion of the film on the spools 4 and 5, and is also provided with a well-known type of curtain shutter 12. A removable cover 13 for the magazine, has mounted on its under side a pressure plate 14, best shown in the enlarged view of Fig. 3. The mounting of this pressure plate comprises four spaced hollow studs 15 which are staked or otherwise secured to the magazine cover 13 while headed screws 16, secured to the pressure plate 14, have limited movement in the hollow stud 15 but springs 17 surrounding the screws normally hold the pressure plate in the position shown in Fig. 3. The pressure plate on each of its four edges is provided with a depending rim 18 which is preferably under-cut at an acute angle such as is indicated at 19.

In stretching the film over such a frame 9 the pressure plate 14 is moved downward until it engages the portions 20 on four sides of the rim of the exposure plate. This downward movement of the pressure plate as shown in Figs. 1 and 2 is effected by a cam 22 mounted for limited rotation in the overhanging edges of the magazine cover 13. As illustrated in these last-mentioned figures, the cam is rotated by means of an arm 23 which extends into a recess in the upper end of the trigger of the shutter operating mechanism 24 so that when the trigger 23 is moved to the position shown in Fig. 2 to effect exposure, the pressure plate 14 is held in the position shown in Fig. 2.

Figure 6:
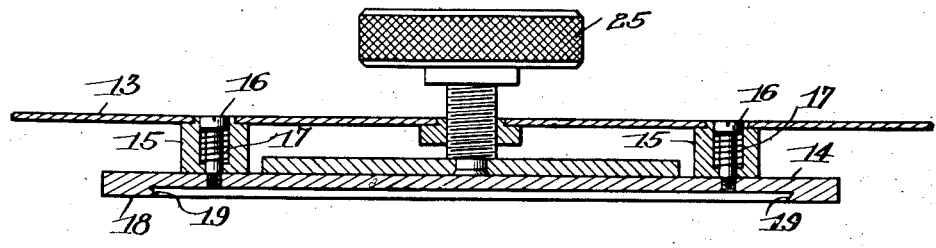

In the modified form of the invention illustrated in Fig. 6 the pressure plate 14 is adjusted to tension the film over the exposure frame by means of the adjustment of the set screw 25. In this instance, of course, the adjustment of the pressure plate is independent of the shutter actuating means.

While the invention is not limited to any theory of operation, it is believed that the device effects the stretching of the film in the following manner. As the pressure plate 14 is moved downward either under action of the cam 22 or the set screw 25, it engages the four high points 20 of the rim on the four sides of the exposure frame so that the film is firmly gripped on four different sides. The exposure frame 9 is slightly resilient and under the pressure of the backing plate is bowed downward an infinitesimal amount as the pressure of the backing is gradually increased to extend its area of contact along the rim portion 20. Since there is a slight curl in commercial film due to the unequal contraction of certain portions thereof, there is of necessity a slight excess of film during the stretching operation and in order to care for this surplus film, the pressure plate is provided with the depending rim 18 having the under-cut portion 19 into which the excess film may extend. The under-cut portion 19 also serves as a recess into which air trapped between the film and the pressure plate may escape, thereby preventing the formation of air bubbles back of the film. Since as shown in Fig. 3 the pressure plate 14 and the exposure frame 9 with its rim are spaced an appreciable distance from the film during its movement, there is no opportunity for the developing of static electricity and the consequent undesirable electrical discharges.

The present disclosure is for purposes of illustration only and the invention is not to be limited thereby except as particularly set forth in the appended claims.

What I claim is:

1. The method of drawing a section of flexible photographic strip into substantially flat position during exposure which comprises first stretching the section at separated points, and then continuing the stretching along a portion of the additional space between the separated points.

2. The method of drawing a section of flexible photographic strip into substantially flat condition during exposure, which comprises first stretching the section at two pairs of separated points, and then continuing the stretching along a portion of the space between the separated pairs of points.

3. The method of drawing a section of flexible photographic strip into substantially flat condition during exposure which comprises first stretching the strip at opposite points at each of four sides of the section and then continuing the stretching progressively along a portion of the space between the separated points.

4. The method of drawing a section of flexible photographic strip into substantially flat condition during exposure which comprises pressing the section against a plain surface by gradually increasing the area of marginal pressure against the surface at four separated points.

5. In a photographic device, means for holding a film strip in substantially flat condition which comprises a flat backing plate, a frame cooperating therewith having a rim of irregular contour, and means for effecting a relative movement between said plate and said frame.

6. In a photographic device, means for holding a film strip in substantially flat condition which comprises a flat backing plate having a depending rim, a frame cooperating therewith having a rim of irregular contour, and a member for effecting relative movement between said plate and said frame.

7. In a photographic device, means for holding a film strip in substantially flat condition which comprises a flat backing plate with depending under-cut edges, a frame cooperating therewith having a rim of irregular contour, and means for causing relative movement between said plate and said frame.

8. In a photographic device, means for holding a flat strip in substantially flat condition which comprises a flat backing plate, and a frame of limited resiliency cooperating therewith, said frame having a rectangular rim, each side of said rim having a high portion sloping generally toward said frame.

9. In combination with a camera having film advancing means, a shutter for exposing sections of said film and a trigger for releasing said shutter, means actuated by said trigger for stretching said film into a flat position.

10. The combination with a camera having means for advancing sections of film into exposure position, a shutter for exposing said film, and a trigger for releasing said shutter, of a film holding device comprising an exposure frame having an upstanding rim of irregular contour on one side of said film, and a backing plate on the other side of said film actuated by said trigger for forcing said backing plate toward said frame.

11. In combination with a photographic device, means for holding a photographic strip in flat position comprising a first member provided with an opening surrounded by a rim, a second member provided with a rim cooperating with said first rim, the edges of one of said rims being of irregular contour, said members being normally spaced apart so that a photographic strip may be moved between them without engagement therewith, and means for moving said members into cooperative relation.

In witness whereof, I hereunto subscribe my name this 5th day of March, 1930.

ALWIN H. BECK.